United States Patent
James

(10) Patent No.: US 7,143,814 B1
(45) Date of Patent: Dec. 5, 2006

(54) COOLING OF MOLDS

(75) Inventor: Malcolm Barry James, Campbelltown (AU)

(73) Assignee: Ritemp Pty Ltd., Eastwood (AU)

( * ) Notice: Subject to any disclaimer, the term of this patent is extended or adjusted under 35 U.S.C. 154(b) by 0 days.

(21) Appl. No.: 10/089,121

(22) PCT Filed: Sep. 25, 2000

(86) PCT No.: PCT/AU00/01160

§ 371 (c)(1),
(2), (4) Date: May 1, 2002

(87) PCT Pub. No.: WO01/23158

PCT Pub. Date: Apr. 5, 2001

(30)  Foreign Application Priority Data

| Sep. 24, 1999 | (AU) | ................ PQ3077 |
| Oct. 11, 1999 | (AU) | ................ PQ3334 |

(51) Int. Cl.
*B29C 45/00* (2006.01)
*B29C 45/03* (2006.01)

(52) U.S. Cl. ............ 165/47; 249/79; 425/547; 425/552; 164/348

(58) Field of Classification Search ............ 165/47; 249/79; 425/547, 552; 164/348
See application file for complete search history.

(56) References Cited

U.S. PATENT DOCUMENTS 4,327,045 A * 4/1982 Nishikawa et al. ............ 249/79
4,333,897 A * 6/1982 Hayashi et al. ............ 249/79
6,048,189 A * 4/2000 Kurihara et al. ............ 425/522

FOREIGN PATENT DOCUMENTS

| FR | 2770897 A1 | 5/1999 |
| WO | 07-276369 | 10/1995 |
| WO | WO 99/64218 A1 | 12/1999 |

* cited by examiner

*Primary Examiner*—Ljiljana Ciric
(74) *Attorney, Agent, or Firm*—J. Harold Nissen; Lackenbach Siegel, LLP

(57) ABSTRACT

An arrangement to assist in heat transfer through a mold for applications such as injection molding of plastics material including at least one closed chamber within the mold, the chamber being only partially filled with liquid and a remainder of the chamber being filled with substantially only vapor of the liquid within the chamber, at least a portion of the chamber being positioned to transmit heat from a targeted location of the mold into liquid within the chamber, and condensing means adapted by reason of heat exchange to effect condensation of vapor within the chamber, the mold being arranged in that the liquid such as water is arranged to be held in the chamber in such a way that the liquid will be distributed to reach or be held at different heights within the chamber. This is achieved in one case by the addition of a foaming agent in the liquid. In another case by having a flock attached to the inner surface of the chamber. In a further example there are separate tiers of reservoirs holding the liquid above a base level of the liquid.

29 Claims, 5 Drawing Sheets

COOLING OF MOLDS

This application claims Paris Convention priority of Australian Applications Nos. PQ 3077 filed Sep. 24, 1999, and PQ 3334 filed Oct. 11, 1999 the complete disclosures of which are hereby incorporated by reference, and priority of International Application number PCT/AU00/01160 having International filing date of Sep. 25, 2000.

TECHNICAL FIELD

This invention relates to cooling of molds.

Such molds can include molds of a type useful for molding of materials of a type including injection molding of plastics materials.

BACKGROUND ART

There has previously been described in previous U.S. patent application Ser. No. 09/719,136 (filed on Apr. 4, 2001 and published as International Publication WO 99/64218 on Dec. 16, 1999), an arrangement in which there is a chamber within a mold which is partially filled with a liquid and a remainder of the chamber is filled substantially only with the vapour of the liquid.

There is arranged a condensing arrangement positioned above a level of liquid in the chamber in relation to a source of heat within the chamber so as to cool and condense thereby vapour formed as a result of conversion from the liquid from the source of heat.

This arrangement has been found to have significant advantages in keeping temperatures of portions of the mold at relatively similar temperatures and therefore those parts of the mold that are used for defining the shape of a molded article and are required to be cooled from time to time to assist in the cyclic use of the mold. Such an arrangement can keep the mold at a more uniform and even temperature through its usage cycles.

One of the problems encountered has been that the head of any liquid within the chamber causes the liquid at a deepest point within a body of the liquid to be implicitly under a higher pressure and therefore the liquid at greater depth will "boil" at a higher temperature than the liquid at lesser depth. This then will result in temperature differences where it would be better if these differences were not so large.

Generally it is an object of this invention to provide improvements to assist in keeping more uniform temperatures in a mold using this general concept or at the least providing the public with a useful improvement in relation to molds.

DISCLOSURE OF THE INVENTION

In one form of this invention there is proposed a mold which includes an arrangement to assist in controlling of a temperature of the mold including at least one closed chamber within the mold, the chamber being only partially filled with liquid and a remainder of the chamber being filled with substantially only vapour of the liquid within the chamber, at least a portion of the chamber being positioned to transmit heat from a targeted location of the mold into liquid within the chamber, and condensing means by reason of heat exchange to effect condensation of vapour within the chamber, the mold being characterized in that the liquid is arranged, in use, to be distributed in the chamber in such a way that the liquid will be distributed to reach or be held at different heights within the chamber.

In preference the different heights of liquid are achieved by having at least one reservoir within the chamber with a bottom of the reservoir being above a bottom of the chamber.

In preference as an alternative the different heights are achieved by having the liquid being applied as a surface application onto an inner surface of the chamber and above a base level of liquid within the chamber.

In preference as an alternative the different heights are achieved by having a passageway with some of the liquid in the passageway where an inlet at least to the passageway is above a base upper level of liquid in the chamber.

In preference as an alternative the different heights are achieved by having the liquid selected or having an additive whereby to effect a foaming.

In one form of this invention this is achieved by having a liquid which is adapted to foam during use of the mold.

A surprising discovery is that in one of the alternative approaches by having the liquid arranged to foam as the liquid is being caused to boil results in the liquid rising as foam containing vapour of the liquid to significantly extend the liquid as a film through the chamber. This then coats the walls of the chamber with liquid.

This has a result of wetting and keeping wetted the inner surfaces of the chamber above any base level of liquid in the chamber so that implicitly the height of the liquid being only a film adhering to the surface of the wall of the chamber will not reflect any substantial head.

In preference in this example the liquid is predominantly water and the foaming agent is a surfactant.

In trials conducted so far, the results have indicated a significant improvement in the use of water to maintain uniformity of temperature especially when the temperature is relatively low such as temperatures in the vicinity of 25 degrees Centigrade. If there were to be a significant head of water then the water at a bottom of this head is under the additional pressure of the head of water and will "boil" at a higher temperature which can be higher than that which is ideal in some cases or unacceptable in other cases.

This then also allows for the quantity of water needed in the chamber and which will normally form a base quantity of liquid to be reduced from what had previously been considered to be necessary. This then allows for the chamber to be of substantial depth without there inevitably being a head of liquid with such height that there will be caused an unacceptable boiling temperature difference of water at a top of a body of water as compared to water at a bottom of the body of water. There are other forms of achieving different heights of liquid within the chamber which will be further expounded.

In preference there is in the chamber, means to effect passage of liquid into a passage forming a part of the chamber having dimensions where surface tension of the liquid would otherwise inhibit passage of liquid thereunto.

Such an effect can be alternatively described as a situation where a vapour lock occurs.

In a further form in preference there are provided means to hold some of the liquid in a reservoir which is, therefore, in conjunction with the size and shape of the chamber and the quantity of liquid in the chamber, providing a head of liquid for use for directing a stream or other flow of the liquid through one or more conduits into places which would otherwise be inaccessible to liquid by reason of vapour lock occurring.

In a further arrangement there is provided a substantially upright conduit with a lower inlet and an upper outlet and a heat source adjacent a part of such conduit, and a means to hold any liquid lifted through the conduit by boiling of liquid effecting a percolator type effect, at a height above a normally existing upper level of liquid in the chamber.

The addition of a foaming agent has the advantage that once boiling occurs anywhere within the liquid, this foam and the water as a film implicit in the foam will readily extend in the manner of foam through the chamber and thereby carry the small amount of water that forms the film forming the foam bubbles with it.

The physical quantity of water that is carried on the foam can be small. Even smaller quantities of liquid however, in the chamber (which will usually be water), will be sufficient because of the technique being used.

What we can have then is a relatively small amount of water with a relatively small amount of foaming agent such as a surfactant appropriate to create foam.

With water being the liquid, if air is then substantially removed from the closed chamber, then boiling will only occur when the temperature of the water is raised above that which will cause a boiling of the water within the defined vapour pressure then existing within the chamber.

If the quantity of water is very small so that it might amount only to perhaps a small percentage of the total volume of the chamber, then with appropriate design of the chamber, the maximum height of water within the chamber can be kept very small indeed. (This then forming a base level of liquid within the chamber.)

It has been found in practice therefore that using the feature of a foaming agent, allows for a significant reduction in the quantity of water necessary for the purpose of holding a more uniform temperature within the mold or other mold. On the other hand, it allows for large and complex molds to be designed with shapes including a cooling chamber or chambers that would normally not provide ready access for such cooling liquid.

Recalling that a significant advantage of the arrangement described is that it is now easier to maintain a working temperature of all parts of the mold within a selected variation over a working cycle of operation and over different parts of the mold it becomes possible now to design molds where cooling techniques which were previously available would not have kept the temperatures within an acceptable or at least a preferred range of temperatures. This can assist with reduced cycle times for a molding process. Furthermore, this effectively eliminates corrosion from any oxidation in the cooling chamber.

The reason corrosion will be eliminated is that a closed chamber will enable the liquid to be used only where this has had oxygen removed, at least to a substantial extent and furthermore, will not have oxygen available by reason of substantial removal of air from the space within the chamber and above the liquid level.

Some features of some molds may need some additional assistance in maintaining continuing liquid access for cooling purposes.

This situation is the case where the chamber has a relatively long and narrow conduit shape noting that the word "conduit" means entry into but does not necessarily mean passage to anywhere else.

In such a case, the surface tension of the liquid such as water in relation to the surface of the chamber may impede continuing access of liquid into the conduit shape or in other words a situation where a vapour lock effect may otherwise result.

Accordingly, there is proposed that there be means to gather liquid within the chamber but at a height higher than an entry position into the conduit shape and means to effect through an injector conduit, a supply of such liquid through the injector conduit into the conduit shape.

A further arrangement for obtaining liquid at a head above the entrance to the conduit is to have a reservoir beneath an area providing for condensing of any vapour within the chamber and then have a conduit extending from such a reservoir down into the injector conduit which has an aperture through which the liquid then will flow at a rate depending upon the head of liquid and the size of the conduit.

With such a reservoir created, which can have then any number of conduits feeding from this into injector conduits as required, such a reservoir is arranged so as to be a relatively shallow reservoir which will quickly overflow in normal operations so as to return most of the liquid to a lower reservoir.

In an alternative arrangement, in preference there is provided a conduit which nonetheless forms a part of the closed chamber which has an inlet at a lower position within the chamber such that this inlet will be below a normal liquid level within the chamber, and an upper outlet which will direct liquid into a holding reservoir of the type previously described for feeding conduits to eventually feed injector conduits.

Further then, there is provided in an adjacent vicinity to this vertical conduit, a member to provide a source of heat targeted to any material within the vertical conduit.

The way in which the heat can be provided can vary significantly from an electrical resistance coil to a conduit connected to a hot water supply. This is a useful adjunct if additional lift of liquid is required in the circumstances of a specific mold.

However, with such an additional heat source, the effect within the conduit therefore is to effect a boiling of the liquid within the conduit and the result that liquid in the manner of a percolator is then lifted by the rising vapour from the inlet through to the outlet.

In a further preferred arrangement, the result is achieved by having one or more dams or reservoirs which hold a limited amount of the liquid and which are arranged to collect the liquid from time to time during the "boiling" of the liquid in the chamber either by reason of rapid transition to vapour effects causing substantial ebullition and therefore implicit lifting of the liquid to appropriate heights, or by reason of condensate being directed to one or more of the dams or reservoirs.

There can be also in preference a combination of foaming agent and distributed reservoirs or dams.

Further, the reservoir or dam or dams can be arranged to overflow as they are filled with the liquid and this cascading effect can ensure that each of the reservoir and dams are kept to only a selected level and therefore head pressure and therefore maintain a reasonably small range of temperatures at which the liquid will boil within any selected reservoir or dam.

In a further development, a surface material is applied to an inner wall of the chamber above a base level of liquid in the chamber, which surface material will assist in retention of liquid in close vicinity to the wall providing thereby a further effective height for the liquid.

In one example, at least some parts of the inner surface of the chamber are coated with a material so that surface tension implicit between the liquid and the material will assist in continuing retention of the liquid against the wall.

In one example, flock in the form of a number of short strands of fibre are attached end on in close vicinity one to the other, to the surface so that liquid which reaches any such selected area thus treated, will be held to be of greater depth and therefore act as a greater reserve. This then allows for a greater tolerance in a refresh rate of liquid needed to keep the surface wet. In other words, the amount of liquid available will be greater than with a smooth surface and allow therefore more tolerance in any replacement of liquid that might be being used.

The replenishment of liquid mechanism can be variously a flow from vapour being condensed above the selected area and therefore seeping or pouring over the area, it can be caused by splattering or spraying from devices within the chamber, it can be subject to replenishment by rising foam, or it can be subject to replenishment simply by ebullient action of the liquid during any boiling action.

In preference then in a further form the invention then could be said to reside in a mold for molding of plastics material where there is a closed chamber using the heat transfer system described to effect a transfer of heat, characterised in that at least some of the surface of the chamber has attached thereto further material or materials to assist in retention of the liquid in the adjacent vicinity of a target surface of the wall of the chamber.

In preference, the liquid is water.

In preference the foaming agent is a foam causing surfactant.

In preference, the materials added are a flock which is adhered by an appropriate adhesion process so that the respective particles of flock are secured end on to the surface of the chamber.

In preference, the thus treated surface is replenished with water from time to time during an operation of the mold by liquid being supplied from above.

In another example, replenishment is effected by foam causing film of the liquid to pass across the selected surface area wetting this thereby.

In another form of this invention this can be said to reside in the method of effecting heat transfer within a closed chamber for the purposes described where the method includes having within the closed chamber only liquid, and the vapour of liquid within a space above the liquid within the chamber, and where a surface of the chamber selected for purpose of extracting heat therefrom is above a level of the liquid within the chamber and effecting replenishment of liquid in respect of that selected area from time to time where the selected area includes a treatment to effect retention of the liquid by use of surface tension of the liquid.

Temperatures of a mold depend to some extent upon the thickness of the metal between the heat source (e.g. a molding surface) and the selected area within the closed chamber. If there is a greater thickness, then there will be a temperature gradient that depends on the various characteristics of the metal of the mold and the respective temperatures at each side. This can be taken advantage of in allowing some parts of a molding surface to be at a different temperature than others.

One problem with such an arrangement is that, because it relies upon an evacuation of the space within the chamber, if for any reason, there is a leak reducing or removing the evacuated state of the space, then this is a status that needs to be rapidly and reliably discernible by an operator.

I have discovered a very reliable and economic arrangement by which such status can be readily determined.

In preference there is further proposed that there be a passageway connecting with the liquid in the chamber which is closed at an upper end and which has at least a portion which can be seen through to the extent that any liquid level within the passageway can be externally determined, and the position of the passageway including its entry and its closed upper end, is such that a level of liquid within the passageway will change from a first level where a first evacuation status within the chamber exists, to a second level where the degree of evacuation within the chamber is less than the first said evacuation status.

In effect then, it is proposed that there be a "sight glass" although its purpose is to indicate a state of evacuation and not to indicate directly at least, any level of water or other liquid within the chamber.

The advantage of the invention arises in so far that when the space within the chamber is evacuated, this will result in an equivalent drawdown of liquid level within the closed passageway.

Where the evacuation of the main chamber is compromised however, this will also then reflect in the conditions within the closed passageway and the level of water or other liquid will then appropriately rise.

There can be then any appropriate further detector of such liquid level so as to provide an automated warning or otherwise.

However, by use of the very simple and ultimately reliable use of the arrangement described, it now becomes a much improved system with the ability to monitor the status of the evacuation.

BRIEF DESCRIPTION OF THE DRAWINGS

For a better understanding of this invention it will now be described with reference to preferred embodiments which shall now be described some with the assistance of drawings wherein.

BEST MODE FOR CARRYING OUT THE INVENTION

Figure 1:
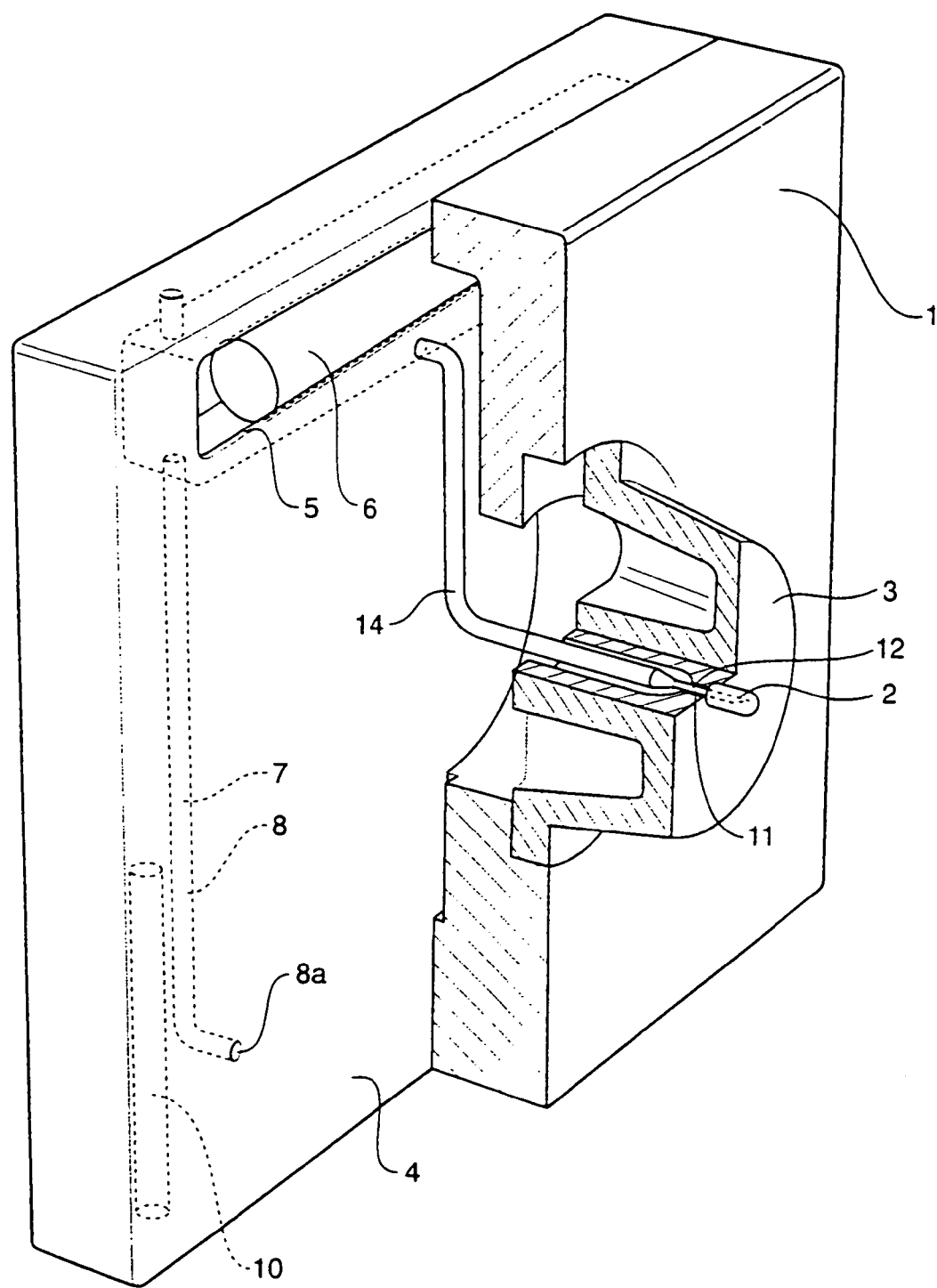
FIG. 1 is a perspective view with part cross section of one part of a plastics injection mold including an inner chamber according to a first embodiment.

Now referring in detail to the drawings and in particular FIG. 1 there is shown here one part or half of a plastics material injection mold 1 where this one half of the mold has a quite arbitrarily chosen shape with a pin 2 extending from a middle of the molding shape 3. A mold to be fully operational will have a further part (which is not shown) forming in this case a female receiving shape which further part will have its temperature controlled with an arrangement and method substantially the same as this first part.

In this first part, then, there is a chamber 4, which is arranged to be closed and to have water inserted therein and air removed.

The extent of removal of air (which in this case is achieved by applying a vacuum pump (not shown) to closable outlet 4a through a wall of the mold) such that substantially all of the air is removed so that only the vapour of the liquid in the chamber substantially fills any remaining chamber area. The liquid which is water in a preferred embodiment is first treated so that substantially all dissolved gases have been removed by, for instance, vigorously boiling the water at standard atmospheric pressure prior to insertion into the chamber 1. If a vacuum pump is used to evacuate air however, such dissolved air can also be removed subsequent to the water being introduced into the chamber 4 by use of the vacuum pump.

In either case the procedure to reduce dissolved gases has the added advantage that the water will be substantially without oxygen when in the closed area of the chamber and therefore deterioration of any metal surface by reason of oxidation (e.g. rust) which will ordinarily occur in existing systems will now not occur in so far that there is not a source of oxygen.

In this embodiment, a small quantity of household detergent is added to the water, the quantity being dependent on the actual detergent being used but generally is a quantity that will result in adequate foaming under the mold operating conditions. In the case of experiments so far, 1% by volume of household detergent (one example being a domestic detergent sold under the Trade Mark of Morning Fresh by the company Cussons Pty Ltd ACN 004 164 827 in Australia) has been added to the water. Alternative foaming agents can be used.

In order to reduce temperature differentials it has been found that if a quantity of water is held with the same head height, then the temperature, in these reduced pressure circumstances, at which the water will boil will depend on the level or more accurately the depth within any water at which boiling of that particular portion of water will take place. If a head of water created by a specific depth is above 200 mm (e.g. 300 mm) then the temperature difference is found to be of significance. Accordingly if the quantity of water is chosen to not then fill the chamber to a height greater than approximately 200 mm then this is found to provide reasonable temperature uniformity. A temperature range between 20 degrees Centigrade and 30 degrees Centigrade may in some cases be considered sufficiently uniform although in other cases a smaller range can be required and can be met by this invention and the principles espoused. The actual temperature difference required can be established and designed for.

By having the water foam, this then has the result of effectively lifting in a film, water to extend as foam through the higher parts of the chamber 4. Any such foam bubbles then will collapse randomly at higher levels with the result that water from such film will splatter onto adjacent surfaces. This then keeps these various surfaces wet in a way which therefore allows such water to boil at a temperature established by the fact that the water is surface water without any overlying head to change its boiling temperature.

Use of foam then allows for most of the surfaces defining the chamber 4 to be kept wet by collapsing foam bubbles.

Further in FIG. 1 this has a shallow trough 5 which is positioned immediately below heat exchanger 6 which is arranged to be kept cool by cooling water passing through the heat exchanger 6 and therefore effecting condensation of vapour rising in the chamber 4. The condensate is directed into the trough 5 and as it overflows the water will run down the side of the mold part 1 into a main body of liquid (water with detergent).

However, a further percolator arrangement 7 is also in place to feed water into the trough 5. This has a vertical tube 8 with an inlet 8a at a bottom of the chamber in order to draw liquid into the tube 8 and an outlet 9 by which to direct lifted water into the shallow trough 5. A source of heat 10 is arranged alongside the tube 8 and this is provided with an electric resistance element so the quantity of heat can be easily controlled and therefore the quantity of liquid that will be lifted with this arrangement.

The value of having a higher level of liquid is that the height can be used to push liquid into places it otherwise might be impeded from going, for instance by reason of surface tension effects. In this case the example is a narrow passage 11. In this we have a needle injector 12 inserting liquid which is running down through tube 14 into the passage 11 where small quantities of liquid are squirted into the narrow passage so as to splash and coat the inner surface of the passage with water. This water is then delivered by a higher level of pressure but on delivery the water is allowed to simply coat the surface. This then allows the effect to keep the temperature of even a small part within a mold to within an acceptable degree of uniformity.

Figure 2:
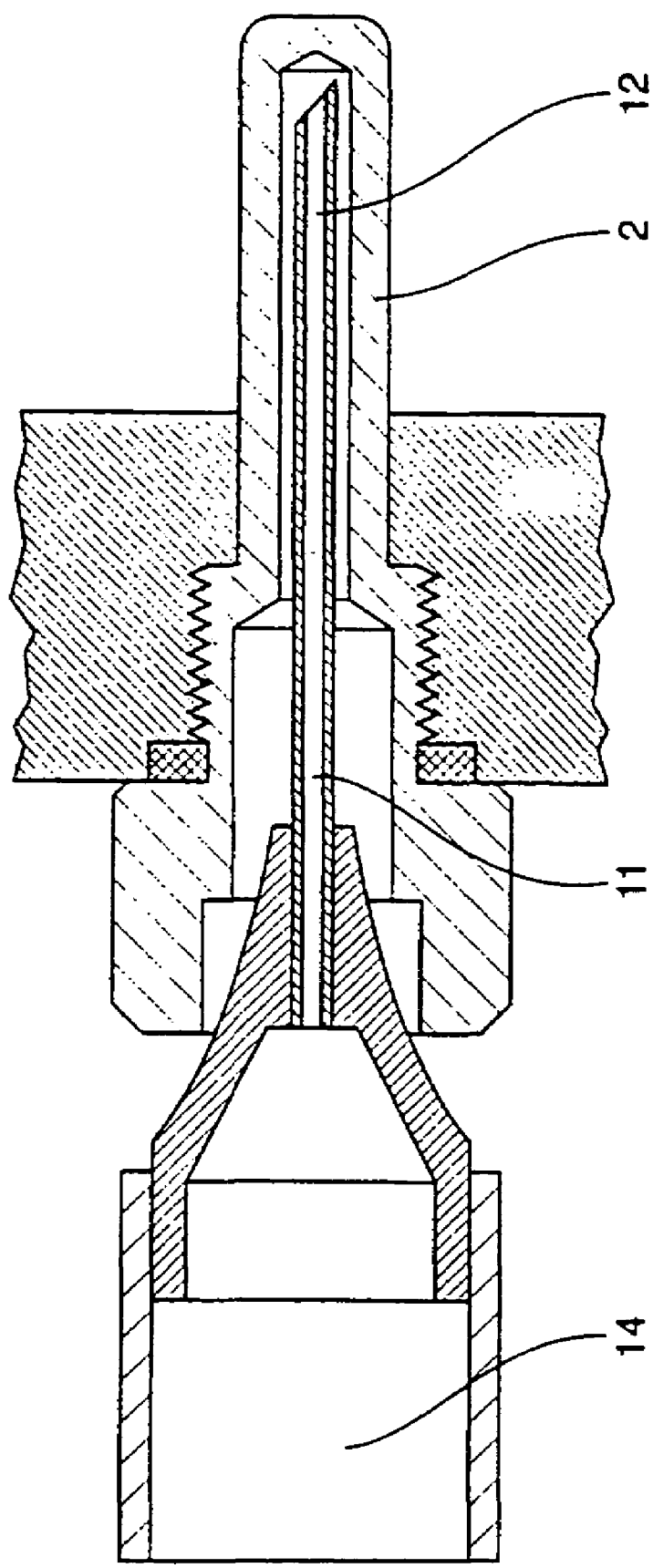
FIG. 2 is a cross section of a part used in a further form of the invention.

Details of the needle injector are shown in greater detail in FIG. 2.

Clearly, the number of tubes and the number of needle injectors can be substantial where however the example is showing just one.

Figure 4:
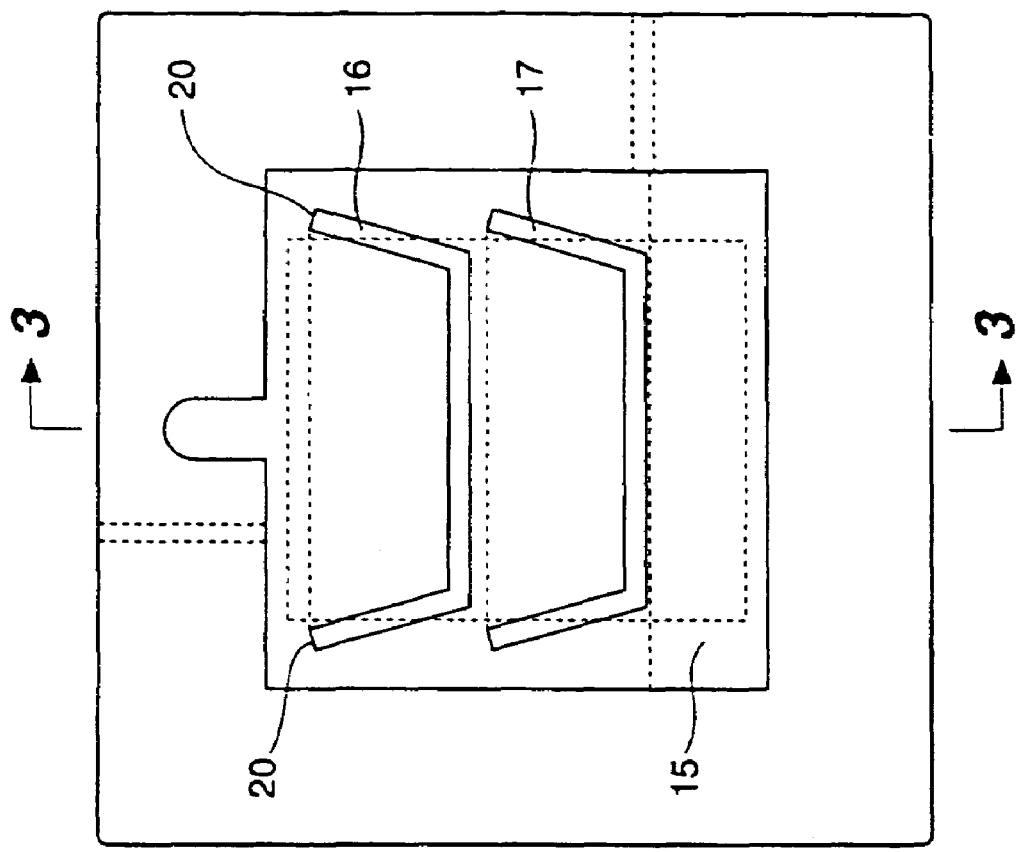
FIG. 4 is a cross sectional view of a second embodiment.
Figure 3:
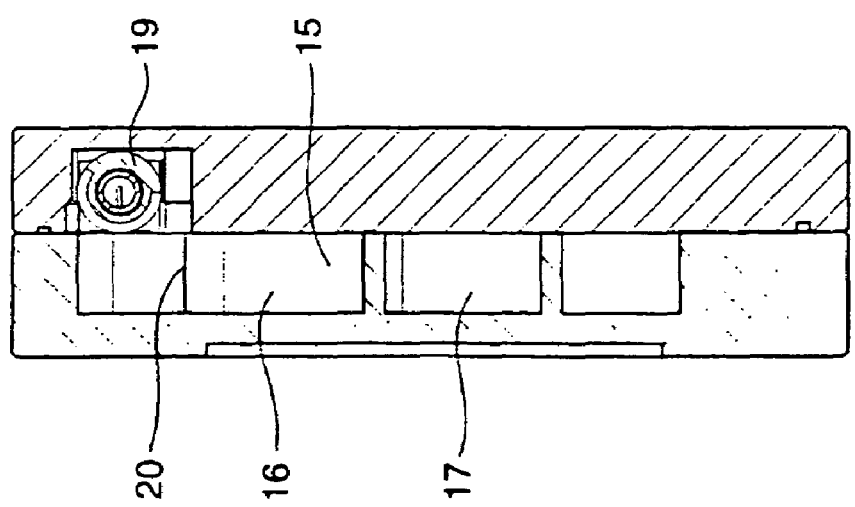
FIG. 3 is a cross sectional view along the lines 4—4 in FIG. 4 of a second embodiment.

In FIGS. 3 and 4 the part shown is only one part of a plastics injection mold and a matching other part or parts will have its or their own temperature distribution arrangement.

Here we have then a chamber 15 which has a plurality of cascading reservoirs 16 and 17 which are fed by liquid returning from the condenser area 19. In this way the liquid is at different heights above a base level within the chamber. Each reservoir 16 and 17 is shaped so that only a selected depth of water will stay in a respective reservoir and hence keep a temperature uniformity. The reservoir in each case is defined by walls 20 which are arranged to allow for overflow of the liquid when filled and such that the overflowing liquid will flow into the next reservoir underneath the first reservoir. The drawing shows an arrangement where however the water may to some extent follow an inward inclination of the wall 20 by reason of surface tension and therefore be directed as a cascade into the next reservoir beneath the first. As can be seen therefore, the head of liquid in any reservoir is determined by the height of water in an individual reservoir and as such this can now be determined by a mold designer appropriate to any application.

In the cases of the described embodiments these are used with the liquid having foaming agent so that some of the advantages of both answers can be achieved in a single mold.

In a further embodiment some of the surface of the chamber has attached thereto a flock which is adhered by an adhesive so that the respective particles of flock are secured end on to the surface of the chamber.

Use of flock enables a greater quantity of liquid to be held in the adjacent vicinity of the inner surface of the chamber in the mold.

Temperatures of a mold depend to some extent upon the thickness of the metal between the heat source (e.g. a molding surface) and the selected area within the closed chamber. If there is a greater thickness, then there will be a temperature gradient that depends on the various characteristics of the metal of the mold and the respective temperatures at each side. This can be taken advantage of in allowing some parts of a molding surface to be at a different temperature than others.

Figure 5:
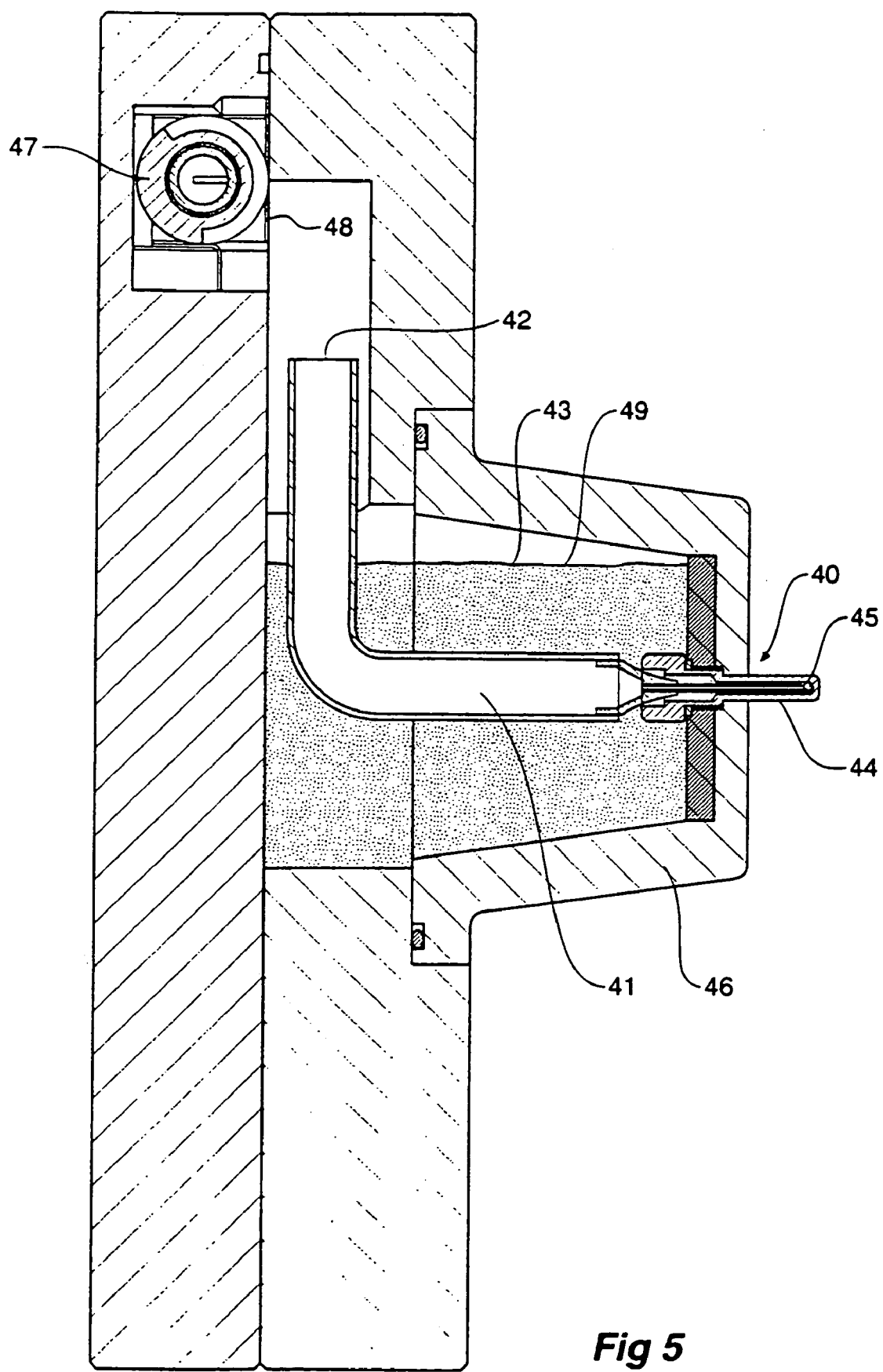
FIG. 5 is a cross section of a third embodiment.

In FIG. 5 there is shown an injector system 40 which has a passageway 41 with an open top 42 positioned in a chamber 43. There is a narrow mold part 44 which is arranged to be fed water through the passageway 41. The open top is at a height somewhat above the height of the part 44 so that any water in the passageway will be forced through the passageway to its lowermost outlet 45. By having such an open top 42 with simply violent boiling of the water together with assisted lifting of the water through a foam assisted action will result in water splashing into the open top 42 and hence feeding the passageway. The mold 46 is again a part of an plastics injection mold with a condenser 47 located in a space 48 above a base level of any liquid 49.

Again then there is described an arrangement where there is distribution of liquid in a way that reduces effects of head of water and therefore causing different boiling temperatures.

Figure 6:
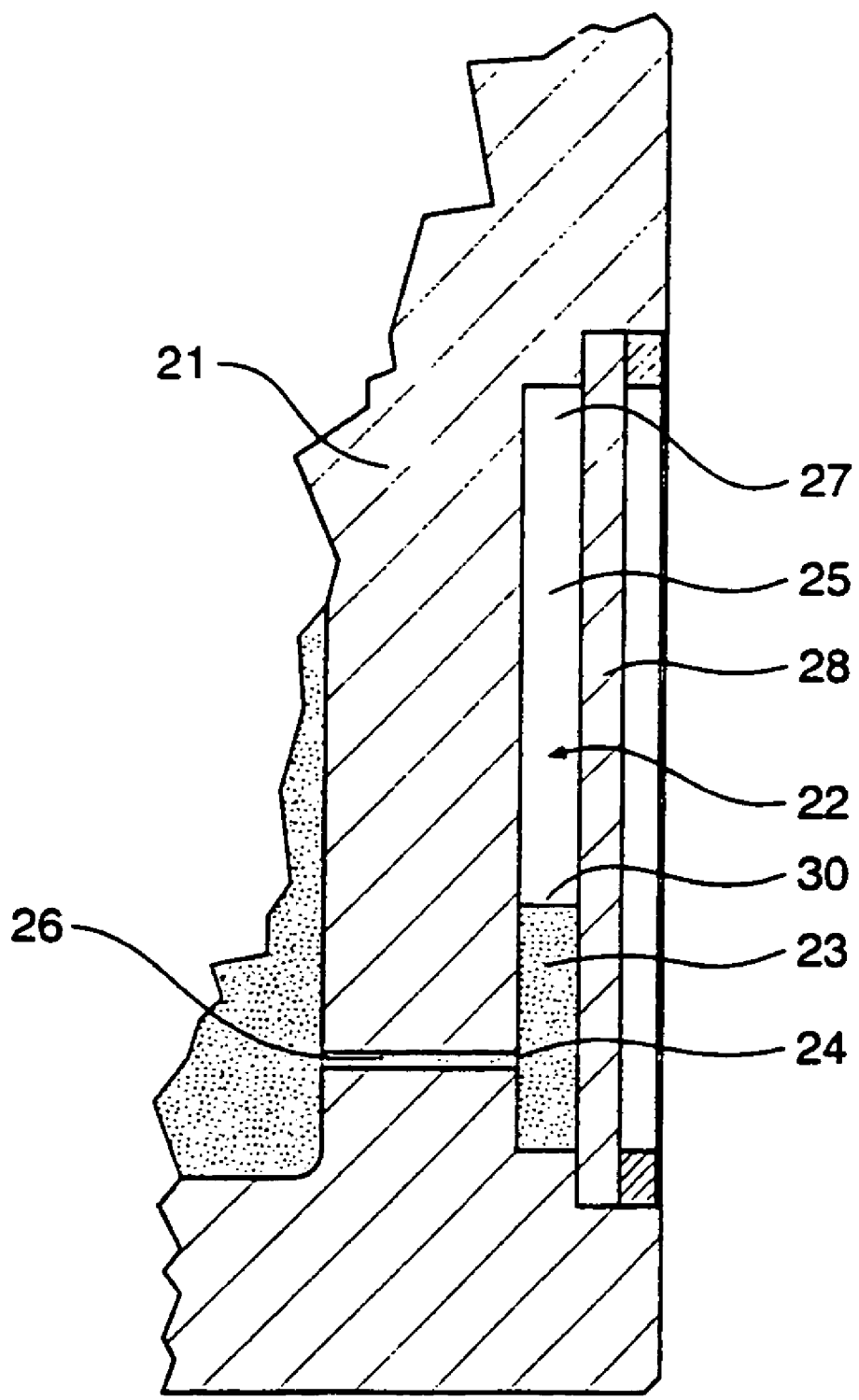
FIG. 6 is a cross section of a portion of a mold according to a fourth embodiment which shows a visual indicator of evacuation status of a chamber.

Referring to FIG. 6, one of the problems with the arrangement described is that if for some reason the evacuated state of the chamber is compromised e.g. a leakage occurs, then an operator needs to know this so that the mold is not further operated until the status is corrected. The problem however is how to reliably and cheaply determine that the evacuated status is being maintained. There is an answer that is both economic and reliable which shall now be further described.

In FIG. 6 then there is shown a mold 21 for injection molding of plastics materials where there is within this, a chamber 22 which is arranged to hold water 23 and the shape of the chamber 22 is such that it will be located adjacent heat generating locations within the mold 21.

There is an opening into the chamber 22 at 24 by which air can be evacuated from a space 25 above the water in accordance with my earlier invention.

The feature of this embodiment is that there is a passageway 26 connected to a main body of the water which passageway 26 progresses from a main body of the chamber to an external viewing location where the passageway is a vertical riser and where a top of the passageway at 27 is closed.

The passageway 26 in this case is formed as a part of the mold except there is embedded within the external surface of the mold a transparent window 28 so that the height of liquid within the passageway will be visible to an external viewer.

With this arrangement then, the effect previously described will be observable which is that the level 30 of the liquid will be an indication of the status of evacuation within the main space of the main chamber 22. If this is changed then this will be observable to an operator who can then establish whether a leakage into the main chamber has occurred and then take appropriate action.

The height of liquid within the closed passageway will be a reflection of the evacuation status of the chamber overall.

What has now been described will allow the design of molds (or molds or other molds) with the ability easily to keep temperatures within a more uniform range than hitherto and the invention described is considered to be of groundbreaking importance in the art.

The invention claimed is:

1. A mold in which a working temperature of all parts of the mold is kept within a small range of temperatures thereby to provide for reduced cycle times, comprising an arrangement to assist in controlling the temperature of the mold, including:
at least one closed chamber;
said chamber being only partially filled with a liquid having low surface tension and in a space above said liquid a remainder of the chamber being filled with substantially only the vapour of said liquid;
at least a portion of said chamber being positioned to transmit heat from a targeted location of the mold into said liquid within said chamber;
condensing means to for effecting condensation of said vapour within said chamber in response to heat exchange, and
enabling means to for enabling said liquid to be distributed in said chamber in such a way that said liquid reaches or is held at different heights within said chamber.

2. The mold as claimed in claim 1, including:
a passageway having an entry connecting with said liquid in said chamber and having a closed upper end and configured such that liquid height within the passageway is visible to an external viewer;
said arrangement being such that a level of liquid within said passageway will change from a first level whereat a first evacuation status within said chamber exists to a second level whereat a second evacuation status exists and the degree of evacuation within said chamber is less than the degree of evacuation at said first evacuation status.

3. A mold as claimed in either of claims 1 or 2, wherein the liquid is predominantly water and a detergent is added to form a foaming agent.

4. A mold as claimed in claim 1 or 2, including a substantially vertical conduit provided with a lower inlet and an upper outlet, a heat source adjacent to a part of said conduit, and means for holding any liquid lifted through said conduit in response to boiling of liquid effecting a percolator type effect, to a height above a normally existing upper level of liquid in said chamber.

5. A mold as claimed in claim 4, including means for gathering liquid within said chamber at a height higher than an entry position into a conduit shape and means for effecting a supply of such liquid through an injected conduit into said conduit shape.

6. The mold as claimed in claim 1, wherein:
said condensing means includes a trough disposed below a heat exchanger forming part of said condensing means being cooled by cooling water passing through said heat exchanger for condensation of vapour rising in said chamber;
a percolator arrangement for feeding water into said trough, and a tube provided with an inlet at a bottom of said chamber for drawing liquid into said tube, said tube having an outlet for directing lifted water into said trough; and
said enabling means including heating means alongside of said tube for controlling the quantity of said liquid that can be lifted.

7. The mold as claimed in claim 6, including:
at least one needle injector comprising a second tube having an inlet associated with said trough for inserting said liquid running down through said second tube into a passage for squirting a quantity of said liquid for splashing and coating said inner surface of said passage.

8. A mold as claimed in claim 6, including:
a passageway;
said chamber including a passage for receiving liquid through said passageway from a main body of liquid;
said passage having dimensions such that the surface tension of the liquid received from said passageway inhibits passage of liquid into said chamber and said passageway which supplies said liquid from the main body of liquid enters said chamber through said passage; and at least one reservoir for holding liquid in said chamber being associated with said chamber so that the liquid held in said chamber provides a head of liquid in said reservoir which is less than the height of the liquid in said chamber.

9. The mold as claimed in claim 1, wherein said enabling means includes a plurality of cascading reservoirs fed by said liquid returning from said condensing means.

10. The mold as claimed in claim 1, including:

injector means positioned in said chamber;

said injector means including a passageway having an open top at one end and a mold part at another end with water being fed to said mold part through said passageway;

said open top being at a height above said mold part such that any water in said passageway will be forced to a lowermost outlet of said mold;

said open top and boiling water resulting in water splashing into said open top and thereby feeding said passageway; and said condensing means being located in an area above a base level of any of said liquid.

11. The mold as claimed in claim 1, wherein said enabling means includes a plurality of cascading reservoirs fed by said liquid returning from a pump or a percolator.

12. A mold as claimed in claim 1, wherein the surface tension of the liquid forms a foaming effect.

13. The mold as claimed in claim 1, including:

a conduit as part of said closed chamber, said conduit having an inlet at a lower position within said closed chamber, and said inlet being below a normal liquid level;

said chamber having an upper outlet for directing liquid into a holding reservoir for feeding conduits to feed injector conduits; and the heat transmitted from the targeted location of the mold supplies heat to any material within said vertical conduit.

14. A mold as claimed in claim 1, wherein the liquid is water.

15. A mold as claimed in claim 1, including a foaming agent in the form of a foam-causing surfactant.

16. A mold as claimed in claim 1, including a passageway having one entry connecting with liquid in the chamber an upper closed end, said passageway having at least a portion which can be seen through to the extent that any liquid level within the passageway can be externally determined and the position of the passageway including said entry end and said closed upper end, is such that a level of liquid within the passageway will change from a first level where a first evacuation status within the chamber exists, to a second level where the degree of evacuation within the chamber is less than the degree of evacuation corresponding to the first evacuation status.

17. The mold as claimed in claim 1, wherein said enabling means to enable said liquid to reach or be held at different heights within the chamber has a bottom and includes at least one reservoir within said chamber having a bottom of said reservoir above said chamber bottom.

18. The mold as claimed in claim 1, wherein said enabling means to enable said liquid to reach or be held at different heights within the chamber includes said surface material coated onto said inner surface above a base level of said liquid within said chamber.

19. The mold as claimed in claim 1, wherein said condensing means include a shallow trough below a heat exchanger forming part of said condensing means being coolede by cooling water passing through said heat exchanger for condensation of vapour rising in said chamber; and said enabling means including heating means alongside of said tube for controlling the quantity of said liquid that can be lifted.

20. The mold as claimed in claim 1, wherein said enabling means includes a liquid capable of foaming during use of said mold, and said liquid when boiling results in said liquid rising as foam containing said vapour of said liquid, which extends said liquid as a film through said chamber, thereby providing for a reduction in the quantity of water necessary for holding a uniform temperature within the mold.

21. A mold comprising an arrangement to assist in controlling the mold temperature, including:

at least one closed chamber within said mold;

said chamber being filled with liquid having low surface tension and vapour of the liquid, said chamber being partially filled with the liquid and the remainder of said chamber being filled with substantially only the vapour of the liquid;

at least a portion of said chamber being positioned to transmit heat from a targeted location of the mold into the liquid within said chamber;

condensing means for effecting condensation of the vapour within said chamber, said condensation of the vapour within said chamber being effected by heat exchange; and means for distribution of the liquid in the chamber to reach or be held at different heights within said chamber such that the liquid is distributed in the chamber in such a way that the liquid reaches and is held at different heights within the chamber.

22. A mold as claimed in claim 21, wherein said distribution means includes at least one reservoir for achieving the different heights of the liquid within said chamber to maintain a bottom of said reservoir above a bottom of said chamber.

23. A mold as claimed in claim 21 or 22, including means for applying the liquid as a surface application onto an inner surface of said chamber and above a base level of the liquid within said chamber to achieve the different heights of the liquid within said chamber.

24. A mold as claimed in claim 21 or 22, wherein said chamber has an area providing for condensing of any vapour within said chamber, and including a reservoir beneath said area and a conduit extending from said reservoir down into an injector conduit, said injector conduit including an aperture through which the liquid will flow at a rate controlled by the head of liquid and the size of the conduit.

25. A mold as claimed in claim 21 or 22, including:

a conduit forming part of said closed chamber, said closed chamber having an inlet at a lower position within said chamber such that said inlet will be below a normal liquid level within said chamber, said chamber including an upper outlet for directing liquid into a holding reservoir; and heating means for providing a source of heat in a vicinity of said conduit.

26. A mold as claimed in 21, including:

at least one vessel comprising a dam or reservoir for holding a limited amount of the liquid and for collecting the liquid from time to time during the boiling of the liquid in the chamber either in response to rapid transition to vapour effects causing substantially ebullition and therefore implicit lifting of the liquid to appropriate heights, or in response to condensate being directed to said at least one vessel; and where there is more than one of said vessels, said vessels being positioned one above the other, means for positioning the more than one of said vessels to enable the vessels to overflow while being filled with the liquid such that a cascading effect from the one of said vessels above the other of said vessels can ensure that each of the more than one said vessel is kept to only a selected level and head pressure and thereby maintaining a selected range of temperatures at which the liquid both at its top and bottom depth will boil within that vessel.

27. A mold as claimed in claim 21, including a passageway for achieving the different heights and with some of the liquid in the passageway, and an inlet to said passageway located above a base upper level of the liquid in said chamber.

28. A mold as claimed in claim 21, including an additive to effect foaming for achieving the different heights.

29. A mold as claimed in claim 21, including a foam-causing film of the liquid to pass across the selected surface area for wetting thereof to effect replenishment.

* * * * *